United States Patent
Daultani et al.

(10) Patent No.: US 12,327,403 B2
(45) Date of Patent: Jun. 10, 2025

(54) INFORMATION PROCESSING APPARATUS, INFORMATION PROCESSING METHOD, AND NON-TRANSITORY COMPUTER READABLE MEDIUM

(71) Applicant: Rakuten Group, Inc., Tokyo (JP)

(72) Inventors: Dinesh Daultani, Tokyo (JP); Mitsuru Nakazawa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 18/009,831

(22) PCT Filed: Dec. 7, 2021

(86) PCT No.: PCT/JP2021/044858
§ 371 (c)(1),
(2) Date: Dec. 12, 2022

(87) PCT Pub. No.: WO2023/105610
PCT Pub. Date: Jun. 15, 2023

(65) Prior Publication Data
US 2024/0135693 A1    Apr. 25, 2024

(51) Int. Cl.
G06V 10/82        (2022.01)
G06V 10/77        (2022.01)
G06V 10/771       (2022.01)

(52) U.S. Cl.
CPC .......... *G06V 10/82* (2022.01); *G06V 10/771* (2022.01); *G06V 10/7715* (2022.01)

(58) Field of Classification Search
CPC ... G06V 10/82; G06V 10/771; G06V 10/7715
See application file for complete search history.

(56) References Cited

U.S. PATENT DOCUMENTS

2010/0250473 A1    9/2010  Porikli et al.

FOREIGN PATENT DOCUMENTS

| CN | 202110737305 A | * | 9/2021 | ........... G06F 18/214 |
| JP | 2010-231768 A | | 10/2010 | |
| JP | 2018-45483 A | | 3/2018 | |
| JP | 2021-114097 A | | 8/2021 | |

OTHER PUBLICATIONS

Cho, Hyunsoo, et al. "Leveraging class hierarchy in fashion classification", 2019, Proceedings of the IEEE/CVF International Conference on Computer Vision Workshops (4 Pages) (Year: 2019).*

(Continued)

*Primary Examiner* — David F Dunphy
(74) *Attorney, Agent, or Firm* — Sughrue Mion, PLLC

(57) ABSTRACT

An information processing apparatus includes: a generating unit configured to generate, from a data group including training data elements given different correct labels, multiple training data sets in such a manner that the number of included training data elements changes successively, by successively selecting one or more training data elements from the data group; and a training unit configured to repeatedly train a learning model for machine learning by applying the training data sets to the learning model.

12 Claims, 8 Drawing Sheets

(56) References Cited

OTHER PUBLICATIONS

Man Seo, et al., "Hierarchical Convolutional Neural Networks for Fashion Image Classification", Expert Systems with Applications, 2018, doi: https://doi.org/10.1016/j.eswa.2018.09.022 (27 pages).

Kolisnik, et al., "Condition-CNN: A hierarchical multi-label fashion image classification model", Expert Systems With Applications, May 12, 2021, pp. 1-14 (14 pages).

Kuzborskij, et al., "Transfer Learning through Greedy Subset Selection", arxiv.org, Jun. 15, 2022, pp. 1-16 (16 pages).

Liu, et al., "Convolutional Network Model using Hierarchical Prediction and its Application in Clothing Image Classification", 3rd International Conference on Data Science and Business Analytics (ICDSBA), 2019, pp. 157-160 (4 pages).

Marchisio, A., et al., "FasTrCaps: An Integrated Framework for Fast yet Accurate Training of Capsule Networks", IEEE, 2020, 8 pages.

* cited by examiner

FIG.5

| TRAINING DATA SET | TRAINING DATA (LABEL) | | | | | | | | | |
|---|---|---|---|---|---|---|---|---|---|---|
| 1 |   | 1 | 2 |   | 4 |   | 6 |   | 8 | 9 |
| 2 |   | 1 | 2 | 3 | 4 |   | 6 | 7 | 8 | 9 |
| 3 |   | 1 | 2 | 3 | 4 |   | 6 | 7 |   | 9 |
| 4 | 0 | 1 | 2 | 3 | 4 |   | 6 | 7 | 8 | 9 |
| 5 | 0 | 1 |   | 3 | 4 |   | 6 | 7 | 8 | 9 |
| 6 | 0 | 1 | 2 | 3 | 4 | 5 | 6 | 7 | 8 | 9 |
| 7 | 0 | 1 | 2 | 3 | 4 | 5 |   | 7 | 8 | 9 |
| 8 | 0 | 1 | 2 | 3 | 4 | 5 | 6 | 7 | 8 | 9 |
| 9 | 0 | 1 | 2 |   | 4 | 5 | 6 | 7 | 8 | 9 |
| 10 | 0 | 1 | 2 | 3 | 4 | 5 | 6 | 7 | 8 | 9 |

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is a National Stage of International Application No. PCT/JP2021/044858 filed Dec. 7, 2021.

TECHNICAL FIELD

The present invention relates to an information processing apparatus, an information processing method, and a program, and in particular relates to a technique for training a learning model.

BACKGROUND ART

Recent years have seen the active use of electronic commerce (E-commerce), in which products are sold over the Internet, and many EC (Electronic Commerce) websites have been built on the web to carry out such electronic commerce. EC websites are often built using various languages of countries around the world so that users (consumers) in many countries can purchase products. By accessing EC websites from a personal computer (PC) or a mobile terminal such as a smartphone, users can select and purchase desired products without visiting actual stores, regardless of the time of day.

Since a large number of products and many types of products are handled by EC websites, in general, products are managed by being hierarchically classified from coarse (upper-level) classes to fine (lower-level) classes. Such product classification is also utilized in the usage of EC websites. For example, on an EC website, products in classes similar to that of products purchased by the user in the past are displayed as recommended products on the screen viewed by the user in order to increase the user's willingness to purchase. Also, the user can more easily find a desired product by finding out the class of the product in a product image (an image including a product). In view of this, the accurate classification of product images is an important issue for EC websites.

Non-Patent Document Literature 1 discloses a technique for performing hierarchical classification on images using a convolutional neural network model.

LISTING OF REFERENCES

Non-Patent Literature Documents

Non-Patent Literature Document 1: Seo Yian, and Shin Kyung-shik, "Hierarchical convolutional neural networks for fashion image classification", Exp. Sys. Appl., Vol. 116, 2019, 328-329.

SUMMARY OF THE INVENTION

Problems to be Solved by the Invention

Although Non-Patent Literature Document 1 discloses a learning model for performing hierarchical classification on objects included in images, there is a problem that as the number of classes in each layer increases and the classification becomes more complex, the efficiency of processing for training the learning model may decrease.

The present invention has been made in view of the above problems, and an object of the present invention is to provide a learning model training technique that effectively prevents a decrease in accuracy even when training a learning model for increasingly complex tasks.

Solution to the Problems

To solve the above-described problem, one aspect of an information processing apparatus according to the present invention includes: a generating unit configured to generate, from a data group including a plurality of training data elements given different correct labels, a plurality of training data sets in such a manner that the number of included training data elements changes successively, by selecting one or more training data elements from the data group; and a training unit configured repeatedly training a learning model for machine learning by successively applying the plurality of training data sets to the learning model in an order in which the plurality of training data sets were generated.

In the information processing apparatus, a configuration is possible in which the generating unit generates the plurality of training data sets from the plurality of training data elements in such a manner that the training data elements change randomly.

In the information processing apparatus, a configuration is possible in which the generating unit generates the plurality of training data sets from the plurality of training data elements in such a manner that the training data elements successively increase/decrease.

In the information processing apparatus, a configuration is possible in which the generating unit generates the plurality of training data sets by generating an initial training data set by randomly selecting one or more training data elements from the data group, and then, beginning with the initial training data set, performing addition and deletion of one or more training data elements randomly selected from the data group.

A configuration is possible in which the learning model includes a convolutional neural network.

A configuration is possible in which the learning model includes a main network that receives input of an object image including an object and extracts a plurality of feature amounts regarding hierarchical classes of the object based on the object image, and a sub network that outputs hierarchical classes of the object with use of the plurality of feature amounts, the main network includes a plurality of extractors that extract the plurality of feature amounts, and the sub network includes a plurality of classifiers that output classes of the object based on the plurality of feature amounts, and in the sub network, a higher-level classifier has a connection to one or more lower-level classifiers.

A configuration is possible in which each of the extractors in the main network includes a plurality of convolution layers.

A configuration is possible in which each of the classifiers in the sub network includes a fully-connected neural network.

A configuration is possible in which the labels each show classes having a hierarchical structure for a corresponding object.

A configuration is possible in which the information processing apparatus further includes an outputting unit configured to output the two or more hierarchical classes determined by the classifying unit.

To solve the above-described problem, one aspect of an information processing method according to the present invention includes: a generating step of generating, from a data group including a plurality of training data elements given different correct labels, a plurality of training data sets in such a manner that the number of included training data elements changes successively, by selecting one or more training data elements from the data group; and a training step of repeatedly training a learning model for machine learning by successively applying the plurality of training data sets to the learning model in an order in which the plurality of training data sets were generated.

To solve the above-described problem, one aspect of an information processing program according to the present invention is for causing a computer to execute information processing including: generating processing including generating, from a data group including a plurality of training data elements given different correct labels, a plurality of training data sets in such a manner that the number of included training data elements changes successively, by selecting one or more training data elements from the data group; and training processing including repeatedly training a learning model for machine learning by successively applying the plurality of training data sets to the learning model in an order in which the plurality of training data sets were generated.

Advantageous Effects of the Invention

According to the present invention, it is possible to provide a learning model training technique that effectively prevents a decrease in accuracy even in mid-term to long-term training.

A person skilled in the art will be able to understand the above-mentioned objective, aspects, and effects of the present invention, as well as objectives, aspects, and effects of the present invention that are not mentioned above, from the following embodiments for carrying out the invention by referencing the accompanying drawings and the recitations in the scope of claims.

BRIEF DESCRIPTION OF THE DRAWINGS

FIG. 5 shows examples of training data sets for the class prediction model.

DESCRIPTION OF EMBODIMENTS

Figure 1:
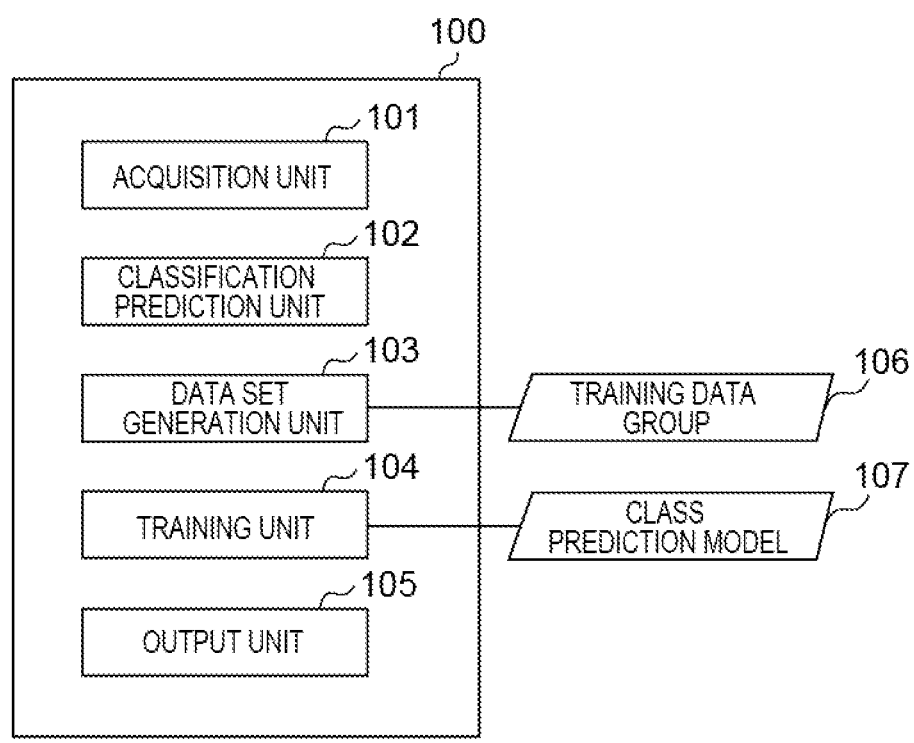
FIG. 1 is a block diagram showing an example of the functional configuration of an information processing apparatus according to an embodiment of the present invention.

Hereinafter, embodiments for carrying out the present invention will be described in detail with reference to the accompanying drawings. Among the constituent elements disclosed below, those having the same function are designated by the same reference numerals, and the descriptions thereof will be omitted. Note that the embodiments disclosed below are examples of means for realizing the present invention, and may be modified or changed as appropriate depending on the configuration of the device to which the present invention is applied and on various conditions, and furthermore, the present invention is not limited to the embodiments below. In addition, not all the combinations of the features described in the embodiments are essential for solutions according to the present invention.

First Embodiment

An information processing apparatus 100 according to a first embodiment acquires an image that includes a product (a product image), and applies the product image to a learning model to predict and output a class for the product image (the product included in the product image). Note that the present embodiment describes an example of predicting hierarchical classes (classes having a hierarchical structure) of a product. Also, the class prediction target is not limited to being a product, and may be any object. Therefore, the present embodiment is also applicable to the case of predicting hierarchical classes of any object from an image that includes the object (an object image).

Functional Configuration of Information Processing Apparatus 100

FIG. 1 shows an example of the functional configuration of the information processing apparatus 100 according to the present embodiment.

The information processing apparatus 100 shown in FIG. 1 includes an acquisition unit 101, a class prediction unit 102, a data set generation unit 103, a training unit 104, and an output unit 105.

Figure 6:
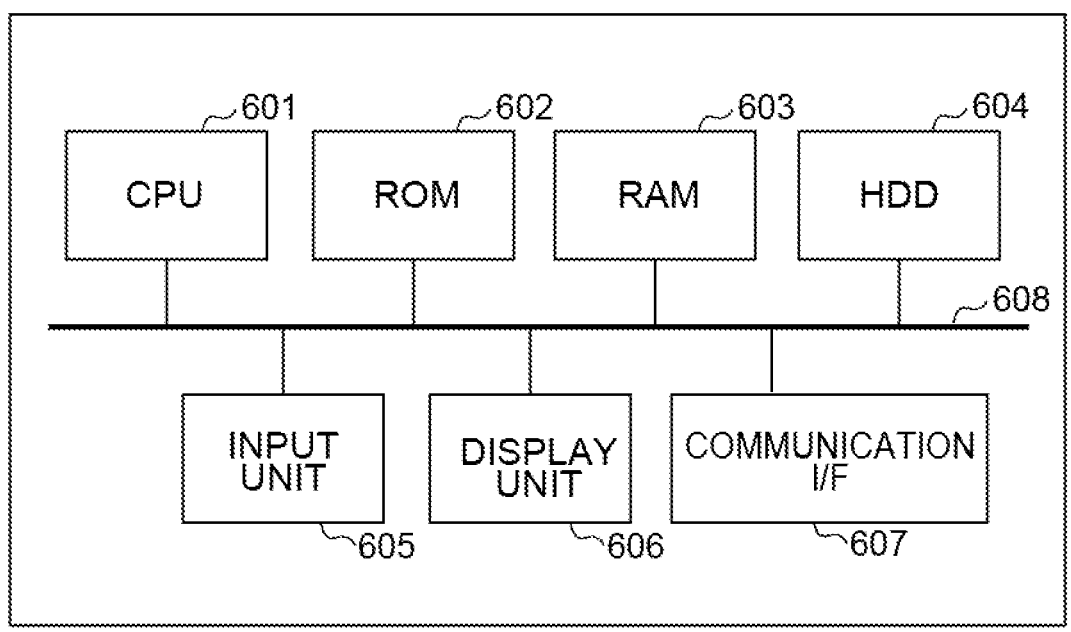
FIG. 6 is a block diagram showing an example of the hardware configuration of the information processing apparatus according to an embodiment of the present invention.

The acquisition unit 101 acquires a product image. The acquisition unit 101 may acquire the product image through an input operation performed by a user (operator) via an input unit 605 (FIG. 6), or from a storage unit (ROM 602 or RAM 603 in FIG. 6) in accordance with a user operation. Also, the acquisition unit 101 may acquire a product image received from an external device via a communication interface (I/F) 607 (FIG. 6). The product image can be an image having colors expressed by the three colors, red (R), green (G), and blue (B). The acquisition unit 101 outputs the acquired product image to the class prediction unit 102.

The class prediction unit 102 applies the product image acquired by the acquisition unit 101 to a class prediction model 107, and predicts classes of a product included in the product image. The class prediction model 107 will be described later.

The data set generation unit 103 generates a training data set for use in training of the class prediction model 107, from a plurality of training data elements (training data) included in a training data group 106. In the present embodiment, the data set generation unit 103 generates a plurality of training data sets, and the training unit 104 successively trains the class prediction model 107 using different training data sets (different sets in a time-series). The class prediction model 107 is a learning model that receives input of a product image that includes a product and predicts classes of the product. The classes may be hierarchical classes.

Figure 2:
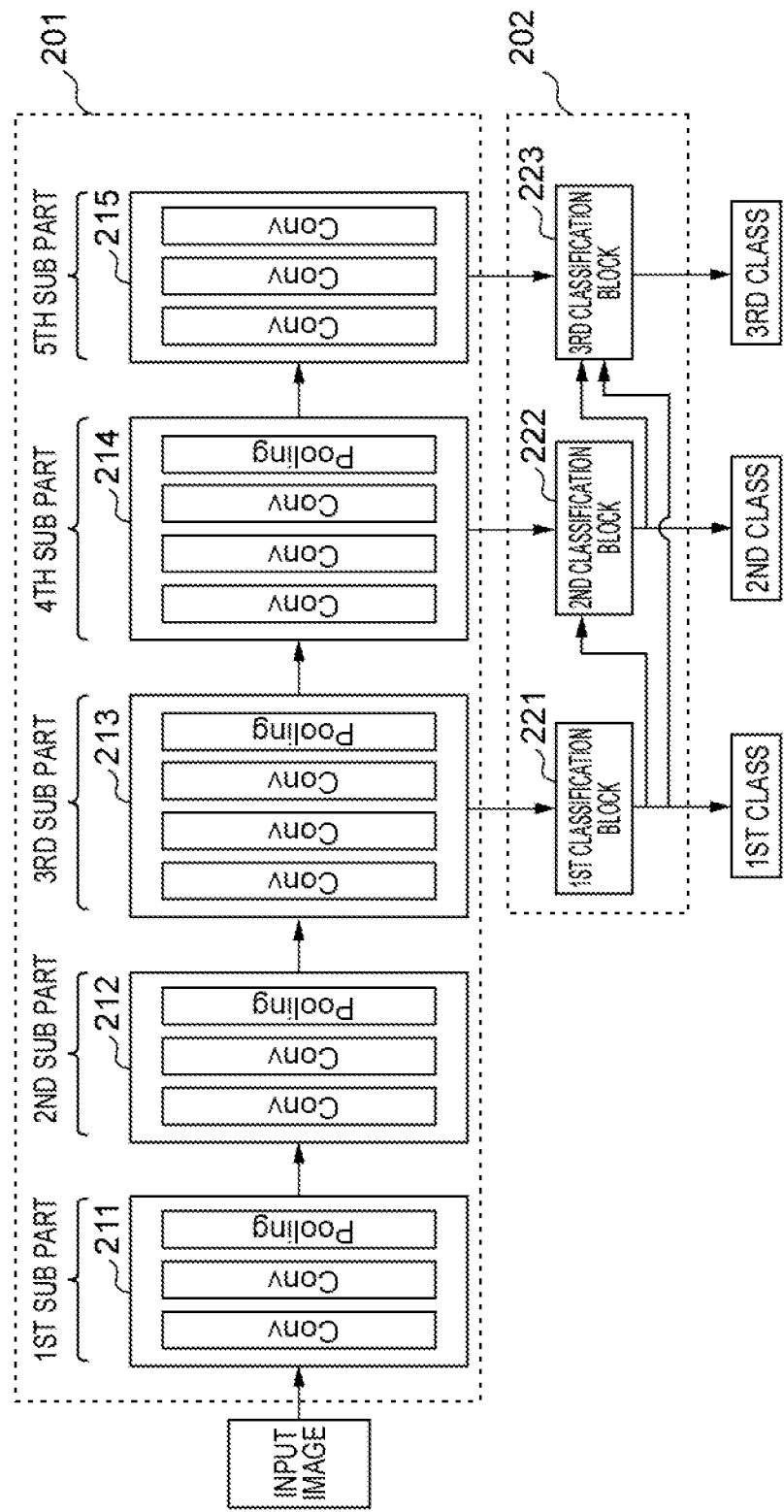
FIG. 2 shows an example of the architecture of a class prediction model.

FIG. 2 shows an example of the architecture of the class prediction model 107. The class prediction model 107 shown in FIG. 2 includes a main network 201 that includes a plurality of sub parts (first to fifth sub parts 211 to 215), and a neural network that includes a sub network 202 that includes a plurality of classification blocks (first to third classification blocks 221 to 223). Note that a sub part will also be referred to as an extractor. Also, a classification block will also be referred to as a classifier.

In the sub network 202 shown in FIG. 2, the output of the first classification block 221 is input to the second classification block 222 and the third classification block 223, and the output of the second classification block 222 is input to the third classification block 223. A skip connection (shortcut connection), which is a configuration in which the output of one block is input to another non-adjacent block in a neural network model, is known in the neural network model ResNet. In ResNet, skip connections are used in feature extraction. On the other hand, the connections between the classifiers in the present embodiment (the first to third classification blocks 211 to 223) are different from known skip connections in that a higher-level classifier is connected to one or more lower-level classifiers. In other words, in the model shown in FIG. 2, the output of a higher-level classifier is input to one or more lower-level classifiers.

The main network 201 shown in FIG. 2 is a neural network based on a 16-layer version of the well-known VGG network (VGGNet), which is a Convolutional Neural Network (CNN) model. In the main network 201, the first sub part 211 and the second sub part 212 each include two convolution layers (Cony) and one pooling layer (Pooling), the third sub part 213 and a fourth sub part 214 each include three convolution layers and one pooling layer, and a fifth sub part 215 includes three convolution layers.

The convolution layers in the first to fifth sub parts 211 to 215 perform convolution with a kernel size of 3×3, but the sub parts have different numbers of filters (numbers of channels). The first sub part 211 has 64 filters, the second sub part 212 has 128 filters, the third sub part 213 has 256 filters, and the fourth sub part 214 and the fifth sub part 215 have 512 filters.

In the pooling layers in the first to fourth sub parts 211 to 214, 2×2 sized max-pooling (MaxPooling) is performed with a stride of two. Also, in the first to fourth sub parts 211 to 214, an ReLU (Rectified Liner Unit) is applied as an activation function between the convolution layers and the pooling layer.

A product image is input as an input image to the main network 201, and the first to fifth sub parts 211 to 215 extract feature amounts of the product image and output the feature amounts as the output of the main network 201. The feature amounts may be feature amounts for hierarchical classification.

In the first to fifth sub parts 211 to 215, product classes are estimated in order from top to bottom. Accordingly, the feature amounts output from the first to fifth sub parts 211 to 215 are in order from higher-level to lower-level, that is to say from feature amounts that indicate higher-level (coarse) classes of the product to feature amounts that indicate lower-level (fine) classes (i.e., feature amounts for hierarchical classification of the product).

The output of the main network 201 is input to the sub network 202. The sub network 202 predicts hierarchical classes from the feature amounts received from main network 201.

The first to third classification blocks 221 to 223 shown in FIG. 2 are each constituted by a fully-connected neural network, receive a feature amount as input, output a label (class) indicating a class of the product in the product image that was input to the main network 201, and determine a class (class name) from the label. The classes (first to third classes) output from the first to third classification blocks 221 to 223 are in order from a higher-level (coarse) class to a lower-level (fine) class of the product. An example of such hierarchical classification will be described later with reference to FIG. 4.

The following is a more specific description of the operations of the first to third classification blocks 221 to 223.

The first classification block 221 outputs a first class label and determines a first class, based on the feature amount output from the third sub part 213 of the main network 201.

The second classification block 222 outputs a second class label and determines a second class, based on the feature amount output from the fourth sub part 214 of the main network 201 and the first class label output from the first classification block 221.

The third classification block 223 outputs a third class label and determines a third class, based on the feature amount output from the fifth sub part 215 of the main network 201, the first class label output from the first classification block 221, and the second class label output from the second classification block 222.

In this way, by complementarily using classification results from a plurality of classifiers, a plurality of lower-level classifiers perform classification based on the classification results output by a higher-level classifier, thus improving the accuracy of hierarchical classification. Note that the present invention is not limited to the configuration shown in FIG. 2, and a configuration is possible in which the classification result of a higher-level classifier is input to one or more lower-level classifiers. For example, the class label output from the first classification block 221 may be input to the third classification block 223 and not input to the second classification block 223.

Note that although an example in which first to third classes are output is shown in the present embodiment, the second classification block 221 and the third classification block 222 apply the feature amounts of higher-level classes, thereby increasing the classification accuracy, and therefore the sub network 202 may be configured to output the second and/or third class, and not output the first class.

Figure 3:
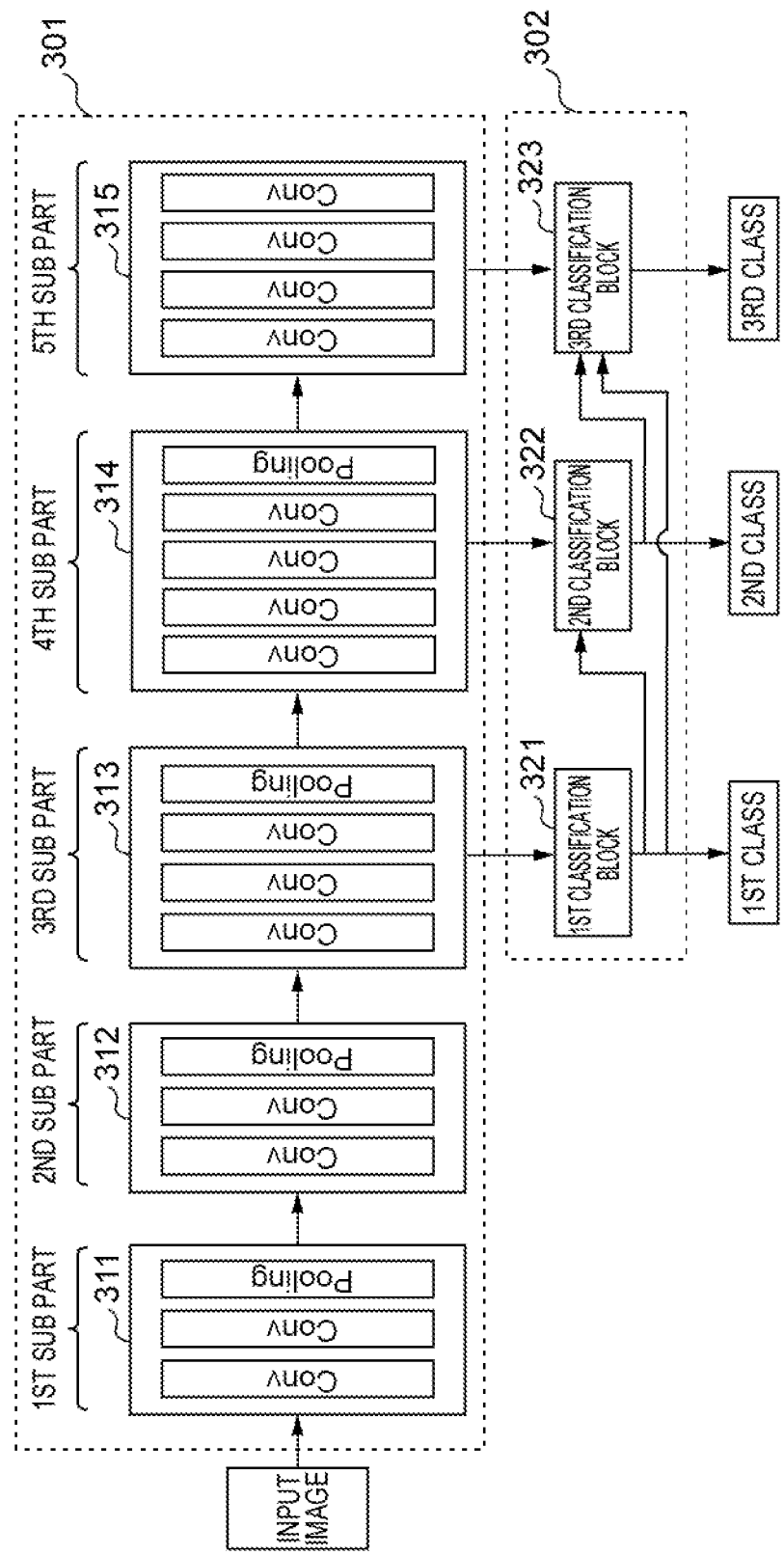
FIG. 3 shows another example of the architecture of a class prediction model.

Also, another example of the architecture of the class prediction model 107 is shown in FIG. 3. The class prediction model 107 shown in FIG. 3 includes a main network 301 that includes a plurality of sub parts (first to fifth sub parts 311 to 315), and a neural network that includes a sub network 302 that includes a plurality of classification blocks (first to third classification blocks 321 to 323). In the sub network 302, the output of the first classification block 321 is input to the second classification block 322 and the third classification block 323, and the output of the second classification block 322 is input to the third classification block 323.

The main network 301 is a neural network based on a 19-layer version of the VGG network. Compared with the model shown in FIG. 2, the first sub part 311 and the second sub part 312 are the same as the first sub part 211 and the second sub part 212, and the third to fifth sub parts 313 to 315 each include one more convolution layer than the third to fifth sub parts 213 to 215. Accordingly, compared with the model shown in FIG. 2, the amount of computation is higher, but deeper learning is performed, which thus may result in more accurate prediction of classes output as a result. The other configurations are similar to those in the model shown in FIG. 2, and thus will not be described.

The training unit 103 trains the class prediction model 107 configured as shown in FIGS. 2 and 3 by successively applying training data sets generated by the data set generation unit 103 to the model. In other words, the training unit 103 repeatedly trains the class prediction model 107 with use of a plurality of training data sets. The training unit 103 then stores the trained class prediction model 107 in a storage unit such as the RAM 603 (FIG. 6).

The class prediction unit 102 applies the product image acquired by the acquisition unit 101 to the trained class prediction model 107 stored in the storage unit such as the RAM 603 (FIG. 6), and predicts classes of the product in the product image.

Figure 4:
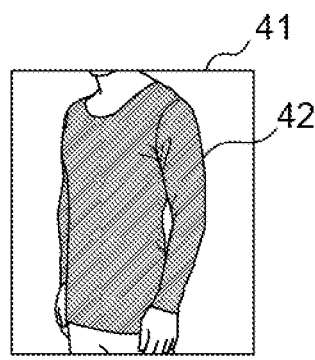
FIG. 4 is a conceptual diagram of hierarchical classification of a product.
Figure 4:
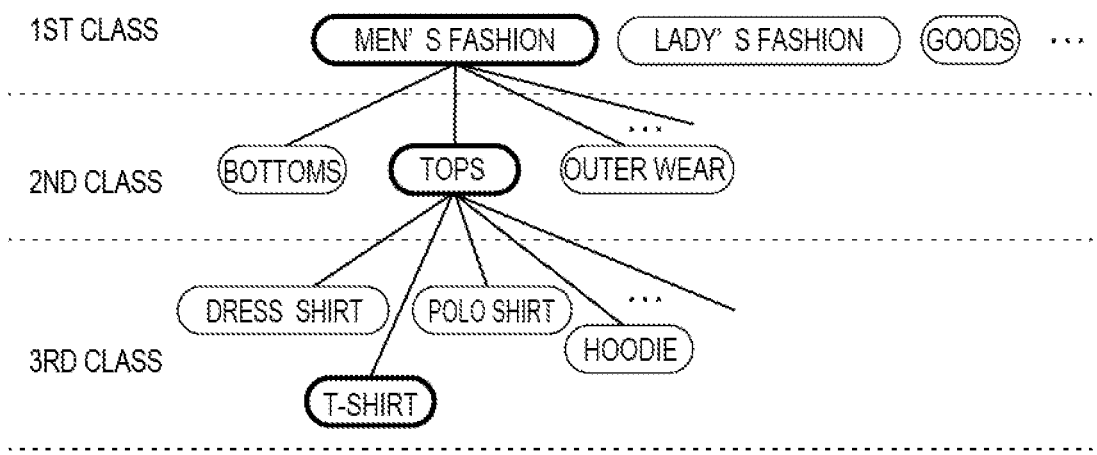

FIG. 4 shows a conceptual diagram of hierarchical classification as an example of classes of a product predicted by the class prediction unit 102. FIG. 4 shows an example of hierarchical classification of a product 42 included in a product image 41. By applying the product image 41 to the class prediction model 107, hierarchical first to third classes are estimated as output from the first to third classification blocks 221 to 223 (or from the first to third classification blocks 321 to 323 shown in FIG. 3).

In the example shown in FIG. 4, the classes shown in bold have been predicted for the product 42. In other words, it is predicted that the first class is "men's fashion", the second class is "tops", and the third class is "T-shirt".

In this way, by performing hierarchical learning in the main network 201 (or the main network 301) in the class prediction model 107, it is possible to predict classes from the higher-level (coarse) first class to the lower-level (fine) third class as the classification result.

Training Data Sets and Training Processing

As previously described, the data set generation unit 103 according to the present embodiment uses a plurality of training data elements included in the training data group 106 to generate a plurality of training data sets for use in training the class prediction model 107. The training unit 104 successively trains the class prediction model 107 using different training data sets (different sets in a time-series).

In the present embodiment, as one example, the training data group 106 includes training data elements in which ten different correct labels (classes) from "0" to "9" are assigned. Each training data element includes a plurality of data sets each including a product image that includes a product and the same label (correct data) indicating the class of the product. Therefore, the same label is assigned to all of the data sets in each training data element. In the present embodiment, the labels indicate classes having a hierarchical structure, and correspond to the labels assigned for the third class associated with the first class and second class described above, for example. Accordingly, referring to FIG. 4, for example, the label "0" corresponds to "T-shirt" associated with "men's fashion" and "tops", and the training data element with the label "0" includes a plurality of data sets each including an image of a T-shirt and the label "0".

In the present embodiment, the data set generation unit 103 generates a plurality of training data sets by applying predetermined generation rules (selection rules).

The following describes generation rules according to the present embodiment. Note that the following rules are merely examples, and a plurality of training data sets may be generated using other rules or by another method, as long as the number of training data elements successively changes. Also, a plurality of training data sets may be generated such that the training data elements change randomly.

The following are generation rules according to the present embodiment.

Rule 1: An initial training data set is generated by randomly selecting sixty percent (60%) of the training data elements included in the training data group 106. In other words, the initial training data set includes six data elements randomly selected from ten training data elements having the labels "0" to "9".

Rule 2: Starting with the initial training data generated in Rule 1, add and delete training data elements (e.g., perform addition every time, and perform deletion every time). For example, two data elements are added, and one data element is deleted. However, if two more data elements do not exist, only one data element is added.

Rule 3: The training data elements that are added/deleted in Rule 2 are selected randomly. In other words, the training data elements to be added are randomly selected from the training data elements not included in the training data set, and the training data elements to be deleted are randomly selected from the training data elements included in the training data set.

FIG. 5 shows an example of training data sets generated by the data set generation unit 103 in accordance with the generation rules. The example in FIG. 5 shows ten training data sets 1 to 10. In FIG. 5, the numbers inside squares correspond to training data elements whose labels have the corresponding number.

Figure 8:
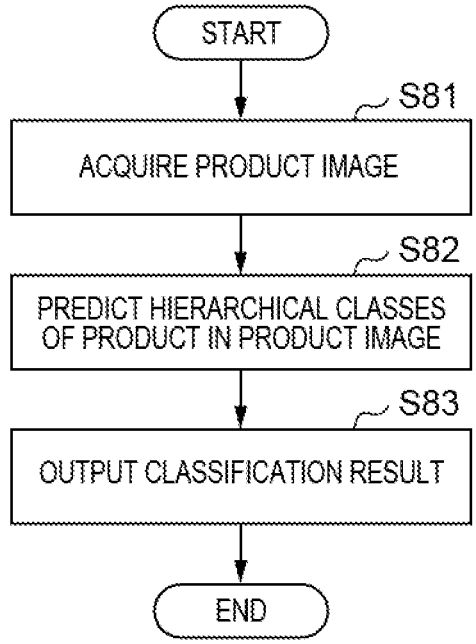
FIG. 8 shows a flowchart of a training phase.

The training data set 1 is the initial training data set that follows Rule 1, and in the example shown in FIG. 8, was generated using the six training data elements having the labels "1", "2", "4", "6", "8", and "9", which were randomly selected from the ten training data elements.

The training data set 2 is a training data set obtained by randomly selecting the two training data elements having the labels "3" and "7" from among the training data elements that have not be selected (are not included in the training data set 1), and adding the selected training data elements to the training data set 1.

The training data set 3 is a training data set obtained by deleting the one training data element having the label "8" from the training data elements included in the training data set 2.

The training data sets 4 and thereafter are also generated by performing addition and deletion in accordance with the above-described generation rules. In these generation rules, the number of training data elements that are added is greater than the number of training data elements that are deleted, and therefore the maximum number of training data sets is set to 10, and the training data sets 1 to 10 are generated such that the number of training data elements successively increases. In this way, the training data sets 1 to 10 are data sets in which the number of training data elements successively increases/decreases. Note that the data set generation unit 103 may generate the training data set by alternately adding and deleting training data elements. Also, the data set generation unit 103 may generate the training data sets by deleting or adding training data elements after successive additions or deletions of training data elements.

The training data sets 1 to 10 generated in this manner are used (applied) in time-series order to train the class prediction model 107. In other words, the training data set 1 is used at a time t to train the class prediction model 107, and the training data set 2 is subsequently used at a time t+1 to train the class prediction model 107. Such learning processing continues until the training data set 10 is used at a time t+9 to train the class prediction model 107. In the present embodiment, the class prediction model 107 is trained with use of different training data sets in time-series order by such learning processing.

Note that in the present embodiment, an example is described in which the training data sets 1 to 10 generated by the data set generation unit 103 are successively applied to the class prediction model 107, but the processing of the data set generation unit 103 and the training unit 104 may be performed repeatedly. In other words, a configuration is possible in which the data set generation unit 103 generates the training data set 1 and then the training unit 104 uses that data set to train the class prediction model 107, whereafter the data set generation unit 103 generates the training data set 2 and then the training unit 104 uses that data set to train the class prediction model 107, and such processing continues until the training data set 10 is used for training.

Hardware Configuration of Information Processing Apparatus 100

FIG. 6 is a block diagram showing an example of the hardware configuration of the information processing apparatus 100 according to the present embodiment.

The information processing apparatus 100 according to the present embodiment can be implemented on one or more computers of any type, one or more mobile devices of any type, or one or more processing platforms of any type.

Although FIG. 6 shows an example in which the information processing apparatus 100 is implemented in a single computer, the information processing apparatus 100 according to the present embodiment may be implemented in a computer system that includes a plurality of computers. The computers may be connected to each other via a wired or wireless network so as to be able to communicate with each other.

As shown in FIG. 6, the information processing apparatus 100 may include a CPU 601, a ROM 602, a RAM 603, an HDD 604, an input unit 605, a display unit 606, a communication I/F 607, and a system bus 608. The information processing apparatus 100 may also be provided with an external memory.

The CPU (Central Processing Unit) 601 performs overall control on the operation of the information processing apparatus 100, and controls various components (602 to 607) via the system bus 608, which is a data transmission path.

The ROM (Read Only Memory) 602 is a non-volatile memory that stores a control program or the like required for the CPU 601 to perform processing. Note that the program may be stored in a non-volatile memory such as an HDD (Hard Disk Drive) 604 or an SSD (Solid State Drive), or an external memory such as a removable storage medium (not shown).

The RAM (Random Access Memory) 603 is a volatile memory and functions as a main memory, a work area, or the like for the CPU 601. That is to say, when performing processing, the CPU 601 loads a required program or the like from the ROM 602 to the RAM 603, and executes the program or the like to realize various functional operations.

The HDD 604 stores, for example, various kinds of data and various kinds of information required for the CPU 601 to perform processing using a program. Also, the HDD 604 stores, for example, various kinds of data and various kinds of information obtained as a result of the CPU 601 performing processing using a program or the like.

The input unit 605 is constituted by a keyboard or a pointing device such as a mouse.

The display unit 606 is constituted by a monitor such as a liquid crystal display (LCD). The display unit 606 may be combined with the input unit 605 to function as a GUI (Graphical User Interface).

The communication I/F 607 is an interface that controls communication between the information processing apparatus 100 and external devices.

The communication I/F 607 provides an interface with the network and communicates with external devices via the network. Various kinds of data, various parameters, and so on are transmitted to external devices and received therefrom via the communication I/F 607. In the present embodiment, the communication I/F 607 may perform communication via a wired LAN (Local Area Network) that conforms to a communication standard such as Ethernet (registered trademark), or a dedicated line. However, the network that can be used in the present embodiment is not limited to these networks, and may be constituted by a wireless network. Examples of this wireless network include a wireless PAN (Personal Area Network) employing Bluetooth (registered trademark), ZigBee (registered trademark), UWB (Ultra Wide Band), or the like. Examples of the wireless network also include a wireless LAN (Local Area Network) employing Wi-Fi (Wireless Fidelity) (registered trademark) or the like, and a wireless MAN (Metropolitan Area Network) employing WiMAX (registered trademark) or the like. Further examples include a wireless WAN (Wide Area Network) employing LTE/3G, 4G, 5G, or the like. The network need only be able to connect devices so as to be able to communicate with each other, and the communication standard, the scale, and the configuration thereof are not limited to the above examples.

At least some of the functions of the constituent elements of the information processing apparatus 100 shown in FIG. 6 can be realized by the CPU 601 executing a program. Also, at least some of the functions of the constituent elements of the information processing apparatus 100 shown in FIG. 6 may be configured to operate as dedicated hardware. In this case, the dedicated hardware operates under the control of the CPU 601.

Processing Flow

Figure 7:
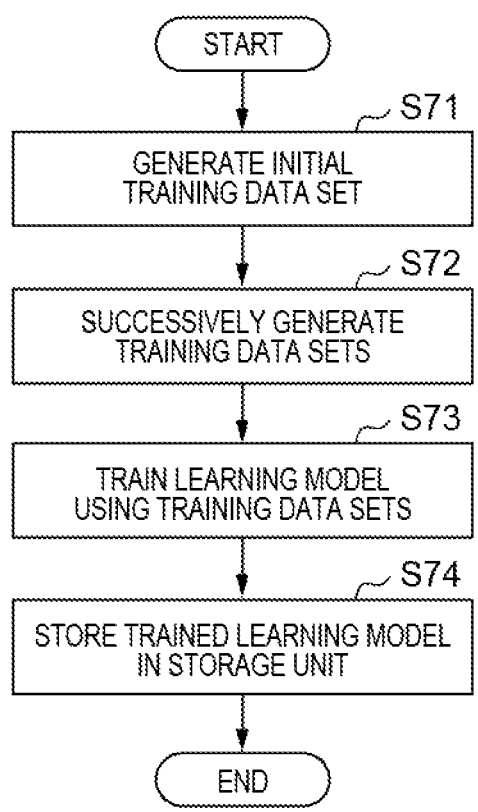
FIG. 7 shows a flowchart of a class prediction phase.

A flow of processing executed by the information processing apparatus 100 according to the present embodiment will be described below with reference to FIGS. 7 and 8. FIG. 7 shows a flowchart of processing (a training phase) for training the class prediction model 107, and FIG. 8 shows a flowchart of class prediction processing (a class prediction phase) performed on a product image (a product included in the product image) with use of the trained class prediction model 107. The processing shown in FIGS. 7 and 8 can be realized by the CPU 601 of the information processing apparatus 100 loading a program stored in the ROM 602 or the like to the RAM 603 and executing the program. FIG. 5 will be referenced in the following description given using FIG. 7.

In step S71, the data set generation unit 103 generates the training data set 1 as the initial training data set. Subsequently, in step S72, the data set generation unit 103 successively generates the training data sets 2 to 10 by repeatedly performing the addition and deletion of training data elements, starting with the training data set 1.

In step S73, the training unit 104 trains the class prediction model 107 by successively using the training data sets 1 to 10 generated in steps S71 and S72 in time-series order. In other words, the training unit 104 trains the class prediction model 107 by successively using the training data sets 1 to 10 generated such that the number of training data elements successively changes dynamically. Accordingly, whereas training data sets that have already been used for training are used again at a different time, new training data sets are also used for training.

In step S74, the class prediction model 107 that was trained in S73 is stored in a storage unit (e.g., the RAM 603) as the trained class prediction model 107 by the training unit 104.

Next, processing in the class prediction phase will be described with reference to FIG. 8.

In step S81, the acquisition unit 101 acquires a product image that includes a product for which classes are to be predicted. For example, when the operator of the information processing apparatus 100 operates the information processing apparatus 100 to access an EC website and select a product image that includes a product, the acquisition unit 101 acquires the product image. Also, the acquisition unit 101 can acquire the product image by acquiring a product image transmitted from an external device such as a user device, or by acquiring a URL indicating the product image. The product image is not limited to including only one product for which classes are to be predicted, and the product image may include a plurality of products for which classes are to be predicted.

In step S82, the class prediction unit 102 inputs the product image acquired by the acquisition unit 101 to the class prediction model 107, and predicts and determines hierarchical classes of the product. As shown in the example in FIGS. 2 and 3, the class prediction model 107 includes a main network that extracts a plurality of feature amounts for hierarchical classification of the product based on the product image, and a sub network that outputs hierarchical classes of the product using the feature amounts. The main network includes a plurality of sub parts (extractors) that extract the feature amounts, the sub network includes a plurality of classification blocks (classifiers) that output classes of the product based on the feature amounts, and higher-level classification blocks have connections to one or more lower-level classification blocks.

In the case of the class prediction model 107 shown in FIG. 2 or 3, as shown in FIG. 4, the class prediction unit 102 predicts and determines a first class, a second class, and a third class (from higher-level to lower-level) as hierarchical classes of the product in the product image acquired in step S81.

In step S83, the output unit 105 outputs the result (classification result) indicating the classes that were predicted and determined by the class prediction unit 102 in step S82. For example, the output unit 105 may display the classification result on the display unit 606 of the information processing apparatus 100, or may transmit the classification result to an external device such as a user device via the communication I/F 607.

Note that in the case where the product image includes a plurality of products, the acquisition unit 101 can acquire a plurality of product regions (regions of interest) that each include one of the products using a known image processing technique, for example, and output the product regions to the class prediction unit 102. Then, the class prediction unit 102 can perform the processing of step S82 for each product region (partial image), and predict and determine classes for each product. The output unit 105 may output separate classification results each indicating the classes (hierarchical classes) of one product, or may output the classes of all of the products as one classification result.

Figure 9:
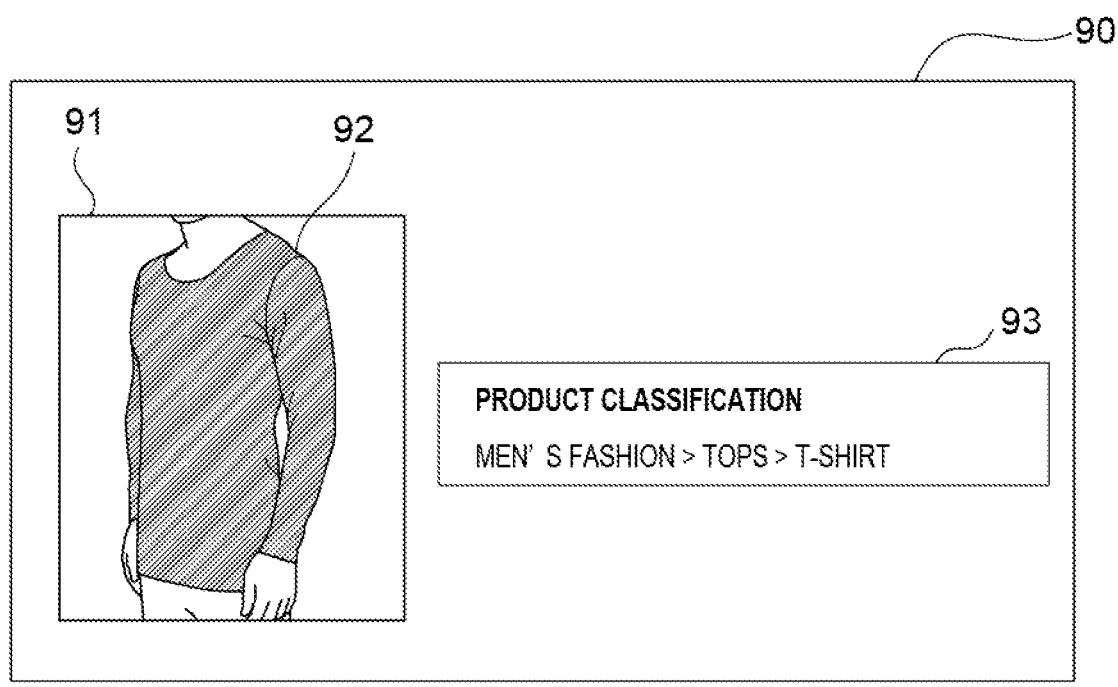
FIG. 9 shows an example of a classification result.

Example of Classification Result FIG. 9 shows an example of a classification result 90 as an example of a classification result output by the output unit 105. The classification result 90 may be displayed on the display unit 606 of the information processing apparatus 100, or may be transmitted to an external device, such as a user device, via the communication I/F 607 and displayed on the external device.

In the classification result 90, the product image 91 is a product image that includes the product for which classes were predicted, and was selected upon the operator of the information processing apparatus 100 operating the information processing apparatus 100 to access an electronic commerce website. Alternatively, the product image 91 may be an image transmitted from an external device such as a user device.

The class prediction unit 102 of the information processing apparatus 100 applies the product image 91 to the trained class prediction model 107 shown in FIGS. 2 and 3 to predict a hierarchical classification 93 for the product 92. The hierarchical classification 93 is similar to the classification shown in FIG. 4. The output unit 105 can combine the hierarchical classification 93 and the product image 91 to form the classification result 90, and output the classification result 90.

Performance Evaluation Results

Table 1 shows results of a simulation for evaluating the performance of class prediction processing. Specifically, Table 1 shows the accuracy rate (Accuracy) for correct data when class prediction processing is performed using various learning models. In this simulation, a Fashion-MNIST data set that can be obtained on the Internet or the like was used as the training data group 106.

TABLE 1

| Learning model | Accuracy | | |
|---|---|---|---|
| | First class | Second class | Third class |
| First comparative model | N/A | N/A | 92.9% |
| Second comparative model | 99.2% | 94.28% | 91.06% |
| Present invention model | 99.72% | 96.52% | 93.36% |

The learning model according to the present embodiment (present invention model) was obtained by training the class prediction model 107 described with reference to FIG. 3 in the first embodiment by successively applying the training data sets 1 to 10 described with reference to FIG. 8.

Also, a first learning model for comparison was obtained as a first comparative model by generating a learning model that includes only the main network 301 and the third classification block 323 of the class prediction model 107 shown in FIG. 3, and training the generated learning model by applying, a single time, the training data set having the labels "0" to "9" as shown in FIG. 8. This learning model can only output the third class.

Furthermore, a second learning model for comparison was obtained as a second comparative model by training the class prediction model 107 described with reference to FIG. 3 in the first embodiment by successively applying six training data sets generated by randomly selecting a plurality of (≤10) pieces of data from the training data group 106.

As can be understood from Table 1, first, for all of the first to third classes, the present invention model has higher accuracy rates than the second comparative model. Also, it can be understood that the present invention model has a higher accuracy rate for the third class than the first comparative model. This is due to the synergistic effect of both using the class prediction model 107 described in the first embodiment and training the class prediction model 107 with use of the training data sets described in the present embodiment in time-series.

As described above, according to the present embodiment, a plurality of training data sets are applied to the class prediction model 107 at different times in a time-series to train the class prediction model 107. Through this consecutive training processing, a learning model is constructed, and increasingly complex classes can be predicted accurately.

Also, as shown in FIGS. 2 and 3, the class prediction model 107 has a configuration in which skip connections are applied to the output of the first to third classification blocks 211 to 223 and the output of the first to third classification blocks 311 to 323. According to this configuration, higher-level classification results are combined with lower-level classification results to predict lower-level classes, thus making it possible to accurately predict hierarchical classes of the product.

Also, in the present embodiment, an example is described in which the class prediction model 107 serving as the learning model is used to predict classes of a product in an input product image, but the training processing of the present embodiment is also applicable to any learning model for machine learning. In other words, training processing may be performed by applying training data sets described with reference to FIG. 5 to a learning model that is constituted by (or includes) a convolutional neural network (CNN).

As described above, according to the present embodiment, it is possible to construct a learning model for increasingly complex classification tasks, and, by using the class prediction model 107 as the learning model, it is possible to accurately predict classes of a product from a product image. This therefore improves the ability to predict trends in products purchased on an EC website, and make it easier for a user to make a product selection, for example.

Although specific embodiments are described above, the embodiments are merely examples and are not intended to limit the scope of the present invention. The devices and the methods described herein may be embodied in forms other than those described above. Also, appropriate omissions, substitutions, and modifications may be made to the above-described embodiments without departing from the scope of the present invention. Embodiments to which such omissions, substitutions, and modifications are made are included in the range of the invention recited in the scope of claims and equivalents thereof, and belong to the technical scope of the present invention.

REFERENCE NUMERALS AND SYMBOLS

100: Information processing apparatus
101: Acquisition unit
102: Class prediction unit
103: Data set generation unit
104: Training unit
105: Output unit
106: Training data group
107: Class prediction model

The invention claimed is:

1. An information processing apparatus comprising:
at least one memory configured to store computer program code; and
at least one processor configured to read the program code and operate as instructed by the program code, the program code comprising:
generating code configured to cause at least one of the at least one processor to generate, from a data group including a plurality of training data elements given different correct labels, a plurality of training data sets in such a manner that the number of included training data elements changes successively, by selecting one or more training data elements from the data group; and
training code configured to cause at least one of the at least one processor to repeatedly train a learning model for machine learning by successively applying the plurality of training data sets to the learning model in an order in which the plurality of training data sets were generated,
wherein a first change among a plurality of successive changes in the number of training data elements comprises increasing the number of training data elements by at least one element,
wherein a second change among the plurality of successive changes comprises decreasing the number of training data elements by at least one element, and
wherein the plurality of successive changes is applied such that a total number of training data elements added exceeds a total number of training data elements deleted.

2. The information processing apparatus according to claim 1,
wherein the generating code is configured to cause at least one of the at least one processor to generate the plurality of training data sets from the plurality of training data elements in such a manner that the training data elements change randomly.

3. The information processing apparatus according to claim 1,
wherein the generating code is configured to cause at least one of the at least one processor to generate the plurality of training data sets from the plurality of training data elements in such a manner that the training data elements successively increase or decrease.

4. The information processing apparatus according to claim 1,
wherein the code is configured to cause at least one of the at least one processor to generate the plurality of training data sets by generating an initial training data set by randomly selecting one or more training data elements from the data group, and then, beginning with the initial training data set, performing addition and deletion of one or more training data elements randomly selected from the data group.

5. The information processing apparatus according to claim 1,
wherein the learning model includes a convolutional neural network.

6. The information processing apparatus according to claim 1,
wherein the learning model includes a main network that receives input of an object image including an object and extracts a plurality of feature amounts regarding hierarchical classes of the object based on the object image, and a sub network that outputs hierarchical classes of the object with use of the plurality of feature amounts,
the main network includes a plurality of extractors that extract the plurality of feature amounts, and
the sub network includes a plurality of classifiers that output classes of the object based on the plurality of feature amounts, and in the sub network, a higher-level classifier has a connection to one or more lower-level classifiers.

7. The information processing apparatus according to claim 6,
wherein each of the extractors in the main network includes a plurality of convolution layers.

8. The information processing apparatus according to claim 6,
wherein each of the classifiers in the sub network includes a fully-connected neural network.

9. The information processing apparatus according to claim 6,
wherein the labels each show classes having a hierarchical structure for a corresponding object.

10. The information processing apparatus according to claim 6, wherein the program code further comprises:
outputting code configured to cause at least one of the at least one processor to output the hierarchical classes of the object.

11. An information processing method comprising:
generating, from a data group including a plurality of training data elements given different correct labels, a plurality of training data sets in such a manner that the number of included training data elements changes successively, by selecting one or more training data elements from the data group; and
repeatedly training a learning model for machine learning by successively applying the plurality of training data sets to the learning model in an order in which the plurality of training data sets were generated,
wherein a first change among a plurality of successive changes in the number of training data elements comprises increasing the number of training data elements,
wherein a second change among the plurality of successive changes comprises decreasing the number of training data elements by at least one element, and
wherein the plurality of successive changes is applied such that a total number of training data elements added exceeds a total number of training data elements deleted.

12. A non-transitory computer readable medium storing a computer program for causing a computer to execute processing comprising:
generating processing including generating, from a data group including a plurality of training data elements given different correct labels, a plurality of training data sets in such a manner that the number of included training data elements changes successively, by selecting one or more training data elements from the data group; and
training processing including repeatedly training a learning model for machine learning by successively applying the plurality of training data sets to the learning model in an order in which the plurality of training data sets were generated,
wherein a first change among a plurality of successive changes in the number of training data elements comprises increasing the number of training data elements,
wherein a second change among the plurality of successive changes comprises decreasing the number of training data elements by at least one element, and
wherein the plurality of successive changes is applied such that a total number of training data elements added exceeds a total number of training data elements deleted.

* * * * *